United States Patent
McMahon

(10) Patent No.: US 11,242,942 B2
(45) Date of Patent: Feb. 8, 2022

(54) VALVE TRIM APPARATUS FOR USE WITH VALVES

(71) Applicant: FISHER CONTROLS INTERNATIONAL LLC, Marshalltown, IA (US)

(72) Inventor: Timothy Arthur McMahon, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 16/440,605

(22) Filed: Jun. 13, 2019

(65) Prior Publication Data
US 2020/0393057 A1 Dec. 17, 2020

(51) Int. Cl.
F16K 47/08 (2006.01)
F16K 1/06 (2006.01)
F16K 27/00 (2006.01)

(52) U.S. Cl.
CPC ............. F16K 47/08 (2013.01); F16K 1/06 (2013.01); F16K 27/003 (2013.01)

(58) Field of Classification Search
CPC . F16K 5/12; F16K 47/02; F16K 47/04; F16K 47/045; F16K 47/08; F16K 47/14; F16K 47/16; F16K 15/144; F16K 15/147; Y10T 137/7839; Y10T 137/784; Y10T 137/7843; Y10T 137/7859; Y10T 137/7881; Y10T 137/7882; Y10T 137/88054; F16L 55/02; F16L 55/027; F16L 55/02709; F16L 55/02718; F16L 55/033; F16L 55/0336
See application file for complete search history.

(56) References Cited

U.S. PATENT DOCUMENTS

| | | | | |
|---|---|---|---|---|
| 4,295,493 A | * | 10/1981 | Bey | F16K 5/0605 138/43 |
| 4,530,375 A | | 7/1985 | Bey | |
| 4,628,961 A | * | 12/1986 | Lew | F16K 47/045 137/599.07 |
| 4,825,906 A | * | 5/1989 | Hartman | F16K 47/08 137/561 A |
| 4,921,014 A | * | 5/1990 | Tartaglia | F16K 47/08 137/494 |

(Continued)

FOREIGN PATENT DOCUMENTS

DE 1094538 B * 12/1960 ............. F16K 47/08

OTHER PUBLICATIONS

United Kingdom Intellectual Property Office, "Combined Search and Examination Report," issued in connection with British Patent Application No. GB2008504.9, dated Oct. 8, 2020, 5 pages.

(Continued)

*Primary Examiner* — Hailey K. Do
(74) *Attorney, Agent, or Firm* — Hanley, Flight & Zimmerman, LLC

(57) ABSTRACT

Methods, apparatus, and systems for valve trim apparatus for use with control valves are disclosed. An example apparatus includes a valve body including a fluid flow path between an inlet and an outlet. The example apparatus also includes valve trim positioned in the fluid flow path, the valve trim including first passageways that extend from the inlet to a first expansion cavity and second passageways that extend from the first expansion cavity to the outlet.

21 Claims, 5 Drawing Sheets

(56) References Cited

U.S. PATENT DOCUMENTS

| | | | | |
|---|---|---|---|---|
| 5,020,571 | A | * | 6/1991 | Tartaglia ................. F16K 47/08 137/625.3 |
| 5,070,909 | A | * | 12/1991 | Davenport ............ F16K 5/0605 137/625.32 |
| 5,180,139 | A | * | 1/1993 | Gethmann ............ F16K 5/0605 137/625.32 |
| 5,480,123 | A | * | 1/1996 | Bey .......................... F16K 1/22 251/127 |
| 5,680,889 | A | * | 10/1997 | Boger ....................... F16K 5/12 137/625.32 |
| 5,769,122 | A | | 6/1998 | Baumann et al. |
| 5,937,901 | A | * | 8/1999 | Bey ...................... F16K 47/045 137/625.32 |
| 5,988,586 | A | * | 11/1999 | Boger ..................... F16K 47/08 138/42 |
| 6,026,859 | A | | 2/2000 | Wears et al. |
| 6,095,196 | A | * | 8/2000 | McCarty ................... F15D 1/02 137/625.3 |
| 6,505,646 | B1 | * | 1/2003 | Singleton ................ F16K 47/08 137/625.3 |
| 6,520,209 | B1 | | 2/2003 | Lundqvist |
| 6,926,032 | B2 | | 8/2005 | Nawaz |
| 7,073,534 | B2 | | 7/2006 | Sawchuk et al. |
| 7,234,488 | B2 | | 6/2007 | Partridge et al. |
| 8,033,300 | B2 | * | 10/2011 | McCarty ................. F16K 47/08 138/42 |
| 9,334,886 | B2 | | 5/2016 | Sawchuk et al. |
| 9,677,687 | B2 | | 6/2017 | Yli-Koski et al. |
| 9,885,375 | B2 | | 2/2018 | Reiss |
| 10,100,947 | B2 | | 10/2018 | Gattavari |
| 10,260,537 | B2 | | 4/2019 | Sawchuk |
| 10,794,794 | B2 | | 10/2020 | Bowdle |
| 2010/0258193 | A1 | * | 10/2010 | Christenson .......... F16K 5/0605 137/1 |
| 2017/0234440 | A1 | * | 8/2017 | Detmers ................. F16K 3/267 251/118 |
| 2018/0106383 | A1 | | 4/2018 | Kuhlman et al. |
| 2020/0393063 | A1 | | 12/2020 | Bell |

OTHER PUBLICATIONS

Institut National De La Propriete Industrielle, "Office Action," dated Sep. 7, 2020, in connection with French Patent Application No. FR2006118, 6 pages. (English summary included).

Institut National De La Propriete Industrielle, "Office Action," dated Sep. 2, 2020, in connection with French Patent Application No. FR2006040, 4 pages. (English summary included).

United Kingdom Intellectual Property Office, "Combined Search and Examination Report," issued in connection with British Patent Application No. GB2008516.3, dated Oct. 8, 2020, 7 pages.

United State Patent and Trademark Office, "Requirement for Restriction," issued in connection with U.S. Appl. No. 16/440,583, dated Jan. 12, 2021, 6 pages.

United State Patent and Trademark Office, "Notice of Allowance and Fee(s) Due," issued in connection with U.S. Appl. No. 16/440,583, dated Aug. 18, 2021, 5 pages.

United State Patent and Trademark Office, "Non-Final Office Action" issued in connection with U.S. Appl. No. 16/440,583, dated May 26, 2021, 9 pages.

* cited by examiner

VALVE TRIM APPARATUS FOR USE WITH VALVES

FIELD OF THE DISCLOSURE

This disclosure relates generally to process control systems and, more particularly, to valve trim apparatus for use with valves.

BACKGROUND

Process units and/or systems like those used in the oil and gas production industry, refining, petrochemical and other manufacturing facilities typically include significant equipment assets, such as process control devices (e.g., a rotary valve, a sliding stem valve, etc.) to control an industrial process. The condition, health, integrity, and/or performance of such process control devices is essential to the efficiency and/or safety of processing plants.

SUMMARY

An example apparatus includes a valve body including a fluid flow path between an inlet and an outlet. The example apparatus also includes valve trim positioned in the fluid flow path, the valve trim including first passageways that extend from the inlet to a first expansion cavity and second passageways that extend from the first expansion cavity to the outlet.

An example apparatus includes first passageways extending from a first surface of the valve trim to a first expansion area, the first expansion area having a first diameter; second passageways extending from the first expansion area to a second expansion area, the second expansion area having a second diameter different than the first diameter; and third passageways extending from the second expansion area to a second surface of the valve trim, the second surface having a third diameter different than the second diameter.

An example apparatus includes a valve body including a fluid flow path between an inlet and an outlet. The example apparatus also includes means for reducing aerodynamic noise positioned in the fluid flow path, the means for reducing aerodynamic noise including passageways and an expansion cavity.

Figure 1:
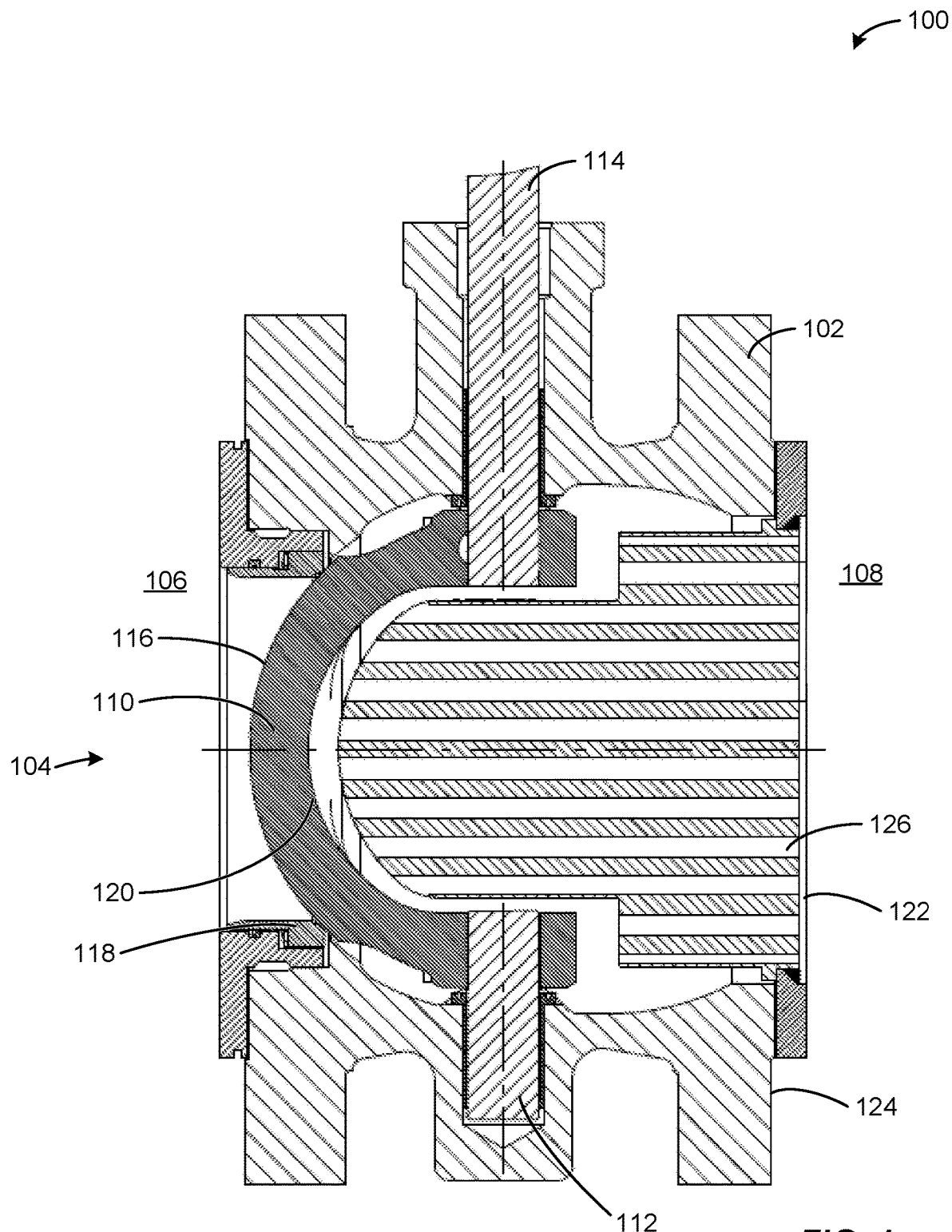
FIG. 1 is a cross-sectional view of a known example rotary valve that may be used to implement examples disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cavitation is one of the leading causes of failure in control valve components. Cavitation occurs in control valves when there is insufficient pressure within a control valve system to maintain a fluid in a liquid state and/or when a liquid is subjected to rapid changes of pressure that cause the formation of cavities in the liquid where the pressure is relatively low. When the fluid within the control valve system is unable to maintain a liquid state, vapor pockets and/or small bodies of gas contained in the liquid (e.g., bubbles) form within the control valve. The vapor pockets can implode and generate an intense shock wave when subjected to high pressures, which can eventually cause damage to components of the control valve. For example, cavitation may erode material from a valve plug, wear/erode the valve seal(s), and/or damage downstream piping. Such damage to components of the control valve system may result in performance degradation or failure of the control valve. For example, cavitation can decrease flow capability through the control valve, cause material damage to valve trim, a valve body, and/or pipeline, and/or can cause excessive noise and/or vibration. Thus, such control valves are only effective for low pressure drop applications (e.g., pressure drops of less than 50 psi).

Some example control valves produce a substantial decrease in pressure or flow rate of a fluid which, in turn, creates a significant amount of aerodynamic noise. For example, elevated pressure drops and/or relatively high flow rates can produce unacceptable noise levels (e.g., aerodynamic noise of approximately 85 A-weighted decibels (dBA)).

Example valve trim disclosed herein include noise-reduction devices (e.g., noise attenuators) to reduce a volume of audible noise created by fluid flowing through a valve. Example valve trim disclosed herein include noise attenuators (e.g., nozzles) formed on fluid passageways of a vale trim. Examples disclosed herein reduce unacceptable high noise levels (e.g., greater than about 85 decibels) produced by control valves (e.g., pressure regulators) in fluid communication with the example apparatus to more acceptable low noise levels (e.g., less than about 85 decibels).

Example valve trim disclosed herein provide certain fluid flow characteristics and/or pressure drop characteristics to reduce noise and cavitation in a control valve. Example fluid control valves implemented with example valve trim apparatus disclosed herein may be employed in relatively high pressure drop applications (e.g., pressure drops of 1000 psi). Such high pressure drop characteristics may be provided by noise attenuators and expansion cavities of the valve trim apparatus disclosed herein. Thus, example fluid control valves implemented with example valve trim apparatus disclosed herein may reduce a potential for liquid cavitation in high pressure drop applications.

Additionally, example valve trim disclosed herein may include one or more noise attenuators and expansion cavities to provide desired fluid flow characteristics such as, for example, enhanced pressure recovery, enhanced flow capacity, reduction or elimination of noise and/or cavitation, etc. For example, pressure recovery is a flow characteristic of a fluid passageway that indicates an amount and/or percentage of increase in fluid pressure after a preceding decrease in fluid pressure. In examples in which valve trim may produce a low pressure recovery, fluid pressure downstream from a passageway may be significantly lower than fluid pressure upstream from the passageway. Low pressure recoveries and/or reduced fluid pressure may result in undesired fluid flow characteristics such as, for example, cavitation and/or reduced noise attenuation.

Example valve trim disclosed herein may include noise attenuators and/or expansion cavities (e.g., recovery plenums) to further provide desired fluid flow characteristics such as, for example, enhanced pressure recovery, enhanced flow capacity, enhanced/reduced fluid velocity, reduction or elimination of noise and/or cavitation, etc. For example, noise attenuators and/or expansion cavities disclosed herein may vary the velocity of a fluid to provide certain pressure drop characteristics to suit the needs of a particular control application.

FIG. 1 depicts a cross-sectional view of a known rotary valve 100 that may be used to implement the examples disclosed herein. The rotary valve 100 is a ball valve (e.g., Fisher® Vee-Ball™ valve). However, any other rotary valve (e.g., a full ball valve, a segmented ball valve, a butterfly valve, a plug valve, an eccentric plug valve, etc.) may be used to implement the examples disclosed herein. The rotary valve 100 includes a valve body 102 defining a fluid flow path 104 between an inlet 106 and an outlet 108. A flow control member 110 is disposed in the fluid flow path 104. In the illustrated example, the flow control member 110 is a segmented ball. Other examples include different flow control members (e.g., a disk, a plug, etc.). In the illustrated example, the flow control member 110 is in the first, closed position. The flow control member 110 is operatively coupled to a follower shaft 112 and a driveshaft 114. The driveshaft 114 may be coupled to a pneumatic actuator (not shown) such as, for example a Fisher® 2052 Diaphragm Rotary Actuator. The actuator may be a single acting actuator or a double acting actuator. Other example rotary actuators may be used to implement the examples disclosed herein such as, for example, a hydraulic actuator or an electric actuator.

The flow control member 110 of the illustrated example includes a convex surface 116 to sealingly engage a valve seat 118 to prevent fluid flow between the inlet 106 and the outlet 108. In the illustrated example, the flow control member 110 includes a concave surface 120 to allow fluid flow between the inlet 106 and the outlet 108 when the flow control member 110 is in an open position. The example rotary valve 100 includes valve trim 122 positioned in the fluid flow path 104 adjacent a first surface 124. The valve trim 122 includes fluid flow passageways 126 to reduce cavitation when fluid flows between the inlet 106 and the outlet 108.

FIGS. 2A-2D illustrate example valve trim constructed in accordance with teachings of this disclosure. In the illustrated example of FIG. 2A, valve trim 200 can be positioned inside the dome of a segmented ball valve and/or the valve body 102 to replace the valve trim 122. In some examples, the valve trim 200 can be positioned between pipes. In examples disclosed herein, the valve trim 200 is positioned in the fluid flow path 104. To position the valve trim 200 in the fluid flow path 104, the valve trim 200 includes an annular ring 202 having a first diameter substantially similar to a diameter of the valve body 102 and/or a pipe that is to be coupled to the valve body 102. As used herein, the term "substantially" implies approximately rather than perfectly. To couple the valve trim 200 to the valve body 102, the annular ring 202 includes openings 204 that can receive fasteners such as screws or bolts to connect two pipes together or connect a pipe to the valve body 102.

Figure 2A:
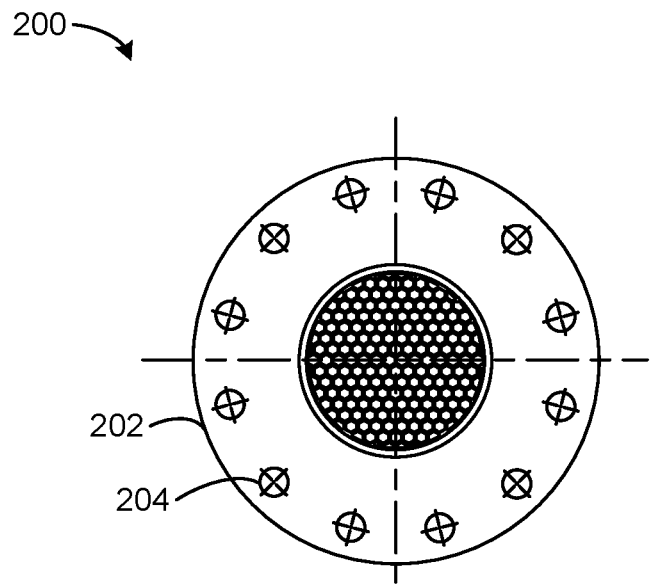
FIGS. 2A-2D are example valve trim constructed in accordance with teachings of this disclosure.
Figure 2B:
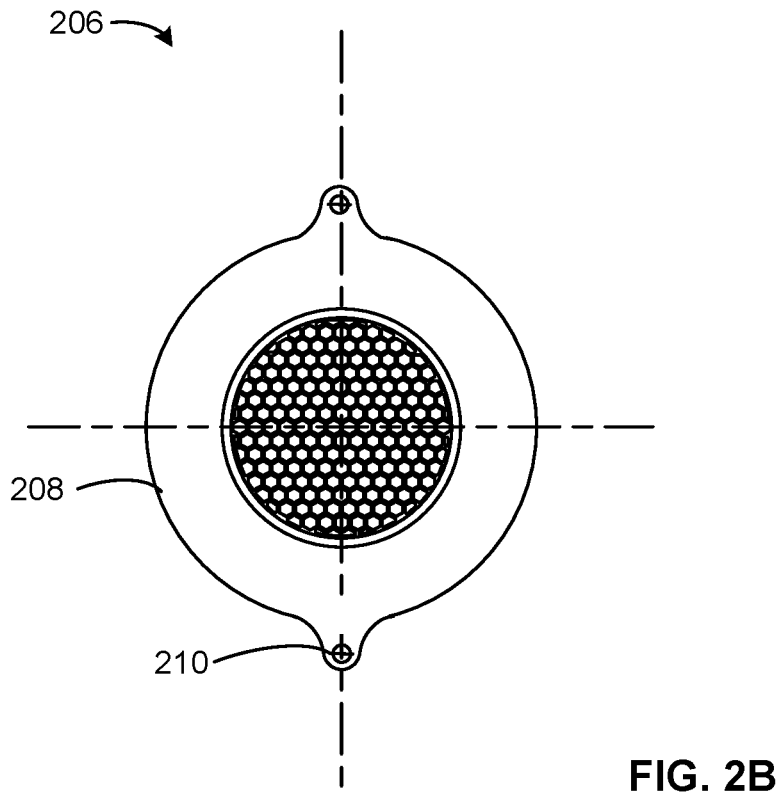

FIG. 2B illustrates example valve trim 206 that can be positioned inside the dome of a segmented ball valve and/or the valve body 102 to replace the valve trim 122 and/or the valve trim 200. In some examples, the valve trim 206 can be positioned between pipes, positioned between the valve body 102 and a pipe, and/or positioned within the valve body 102 (e.g., an inner surface of the valve trim 214 abuts the first surface 124 of the valve body 102). In examples disclosed herein, the valve trim 206 is positioned in the fluid flow path 104. To position the valve trim 206 in the fluid flow path 104, the valve trim 206 includes an annular ring 208 having a first diameter that is smaller than a diameter of the valve body 102 and/or a pipe that is to be coupled to the valve body 102. To couple the valve trim 206 to the valve body 102, the annular ring 208 includes openings 210 that can receive fasteners such as screws or flange bolts to couple the valve trim 206 directly to the valve body 102. In some examples, the annular ring 208 may be serrated to form a seal when positioned (e.g., compressed) between a pipe and the valve body 102.

Figure 2C:
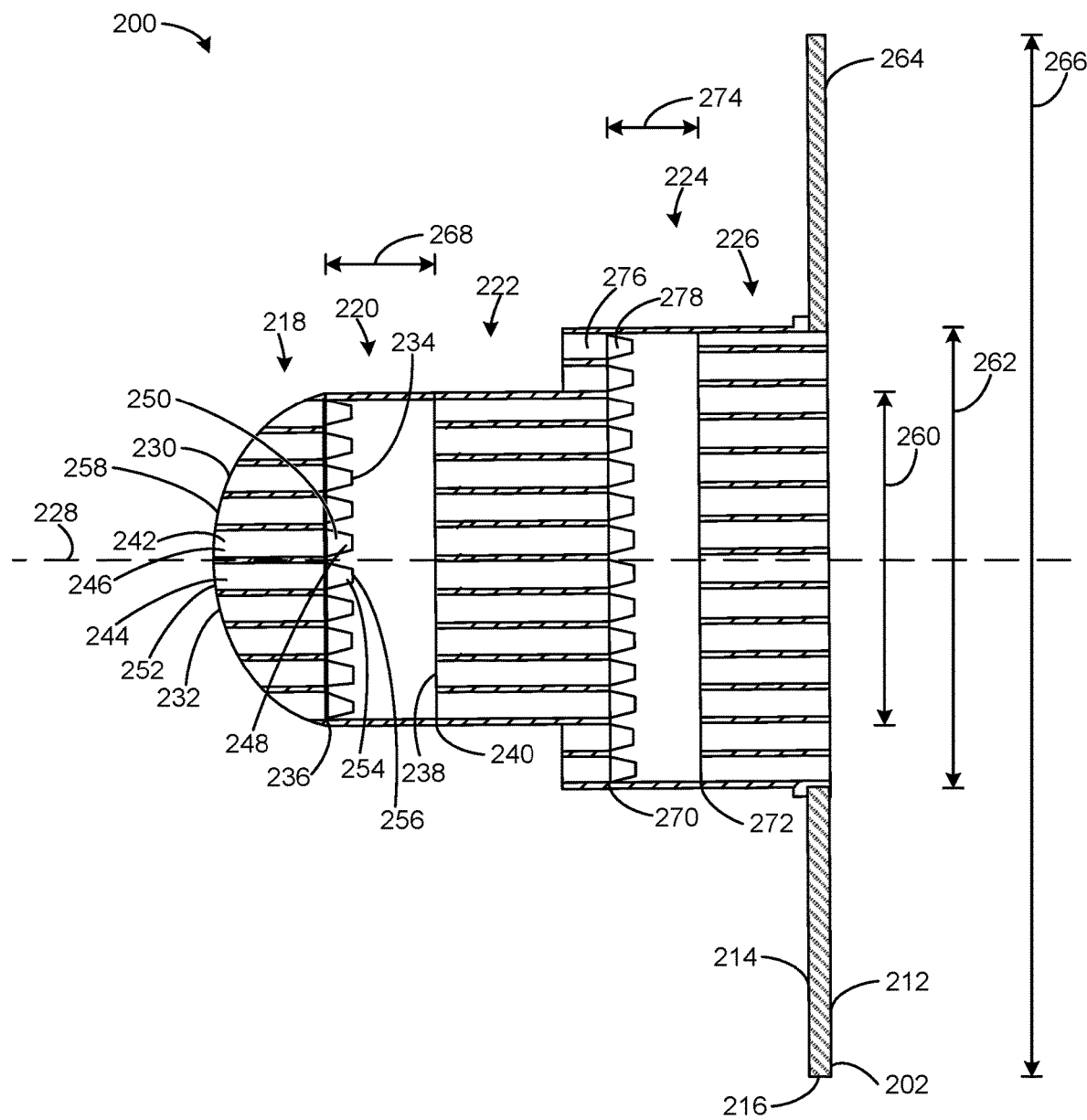

Turning to FIG. 2C, a cross-section of the example valve trim 200 of FIG. 2A is illustrated. The annular ring 202 of the illustrated example has a first surface 212 and a second surface 214. The first surface 212 is to abut a surface of a pipe and the second surface 214 is to abut a face of the valve body 102. The annular ring 202 has a thickness 216 that is sized to maintain the structural integrity of the valve trim 200 when the valve trim 200 is positioned in the fluid flow path 104.

In the illustrated example of FIG. 2C, the valve trim 200 includes first passageways 218 that extend from the inlet 106 to a first expansion cavity 220, second passageways 222 that extend from the first expansion cavity 220 to a second expansion cavity 224, and third passageways 226 that extend from the second expansion cavity 224 to the outlet 108. The first passageways 218, the second passageways 222, and the third passageways 226 of the illustrated example extend along a longitudinal axis 228 of the valve trim 200 (e.g., the valve body 102).

In examples disclosed herein, the first passageways 218, the second passageways 222, and the third passageways 226 have hexagonally shaped cross-sections to increase flow capacity as fluid flows from the inlet 106 to the outlet 108. However, the first passageways 218, the second passageways 222, and the third passageways 226 can be any shape or size to increase the flow capacity produced by the valve trim 200 as fluid flows through the first passageways 218, the second passageways 222, and the third passageways 226. The first passageways 218, the second passageways 222, and the third passageways 226 can have the same diameter or different diameters. That is, the first passageways 218 can have a first diameter, the second passageways 222 can have a second diameter different than the first diameter, and the third passageways 226 can have a third diameter different than the first and second diameters. Additionally, the plurality of passageways that comprise the first passageways 218 can have varying diameters (e.g., a first plurality of passageways of the first passageways 218 have a first diameter on a first side of the longitudinal axis 228, and a second plurality of passageways of the first passageways 218 have a second diameter on a second side of the longitudinal axis 228). The first passageways 218, the second passageways 222, and the third passageways 226 may have cross-sections that are hexagonally shaped, diamond shaped, circular, ovular, polygonal and/or any other cross-sectional shape or profile and/or combination thereof, as discussed in more detail below in connection with FIGS. 3A-3E. Additionally, the valve trim 200 can be formed via additive manufacturing (e.g., 3D Metal Printing, 3D Wax Printing, 3D Binder Jet Sand Mold Printing, etc.) to form a unitary structure (e.g., a unitary valve trim 200) including the first passageways 218, the second passageways 222, and the third passageways 226.

In the illustrated example of FIG. 2C, the first passageways 218 include inlets 230 at a first end 232 of the valve trim 200 and outlets 234 at a first end 236 of the first expansion cavity 220. The second passageways 222 of the illustrated example include inlets 238 at a second end 240 of the first expansion cavity 220 opposite the first end 236 of the first expansion cavity 220.

To reduce aerodynamic noise when fluid is flowing through the valve trim 200, the first passageways 218 include a first passageway 242 and a second passageway 244. The first passageway 244 of the illustrated example includes a first end 246 adjacent the inlet 230 and a second end 248 adjacent the first expansion cavity 220. In the illustrated example, the first passageway 242 includes a nozzle 250 formed on the second end 248 to modify the flow of fluid as the fluid exits the first passageway 242. In the illustrated example, the second passageway 244 includes a third end 252 adjacent the inlet 230 and a fourth end 254 adjacent the first expansion cavity 220. The second passageway 244 of the illustrated example includes a nozzle 256 formed on the fourth end 254 to modify the flow of fluid as the fluid exits the second passageway 244. In the illustrated example, the nozzle 250 formed on the second end 248 includes a first nozzle type, and the nozzle 256 formed on the fourth end 254 includes a second nozzle type. For example, the nozzles 250, 256 can be hexagonally shaped, diamond shaped, circular, ovular, polygonal and/or any other shape or profile and/or any shape, size, and/or spacing to control fluid flow and/or reduce or eliminate cavitation, and/or noise through the rotary valve 100, as described in more detail in connection with FIGS. 3A-3E.

In some examples, the first passageways 218 extend from a first surface 258 of the valve trim 200 to the first expansion cavity 220 (e.g., a first expansion area). In the illustrated example of FIG. 2C, the first expansion area 220 has a first diameter 260, and the second expansion area 224 has a second diameter 262 different than the first diameter 260. In some examples, the third passageways 226 extend from the second expansion area 224 to a second surface 264 of the valve trim 200, the second surface 264 having a third diameter 266 different than the second diameter 262. In some examples, the first end 236 and the second end 240 of the first expansion area 220 are separated by a first distance 268. In some examples, the second expansion area 224 includes a third end 270 and a fourth end 272 separated by a second distance 274 different than the first distance 268. In the illustrated example, the first passageways 218 include a plurality of flow paths (e.g., inlets 230), the flow paths 230 include nozzles (e.g., nozzle 250) formed on respective ends of the flow paths 230. The second passageways 222 of the illustrated example include a plurality of flow paths 276 with nozzles 278 formed on respective ends of the first flow paths 276. In some examples, the second passageways 222 and the second expansion cavity 224 are a means for reducing aerodynamic noise.

The first passageways 218, the second passageways 222, and the third passageways 226 define a plurality of passageways (e.g., fluid flow paths) that split, divide or segregate fluid flow from the inlet 106 into multiple, smaller fluid streams to dissipate energy of the fluid as the fluid flows through the valve trim 200 to reduce aerodynamic noise generated by fluid flow rates and/or pressure drops through the valve 100.

In operation, the nozzles 250, 256, 278 and the expansion cavities 220, 224 dissipate energy of fluid to reduce noise produced by high energy fluid flowing through the valve trim 200. For example, as the fluid passes between the inlet 106 and the outlet 108 of the valve 100, the fluid impacts or flows through the first passageways 218, the second passageways 222, and the third passageways 226, a volume of the valve trim 200 gradually expands (e.g., from the first diameter 260 to the second diameter 262, etc.) from the first passageways 218 to the second passageways 222 to the third passageways 226, which work together to dissipate energy of the fluid to reduce aerodynamic noise. More specifically, the nozzles 250, 256, 278 and expansion cavities 220, 224 successively reduce pressure and/or velocity of fluid flowing through the first passageways 218 and the second passageways 222 to provide a staged reduction or dissipation of energy of fluid exiting the valve trim 200.

Figure 2D:
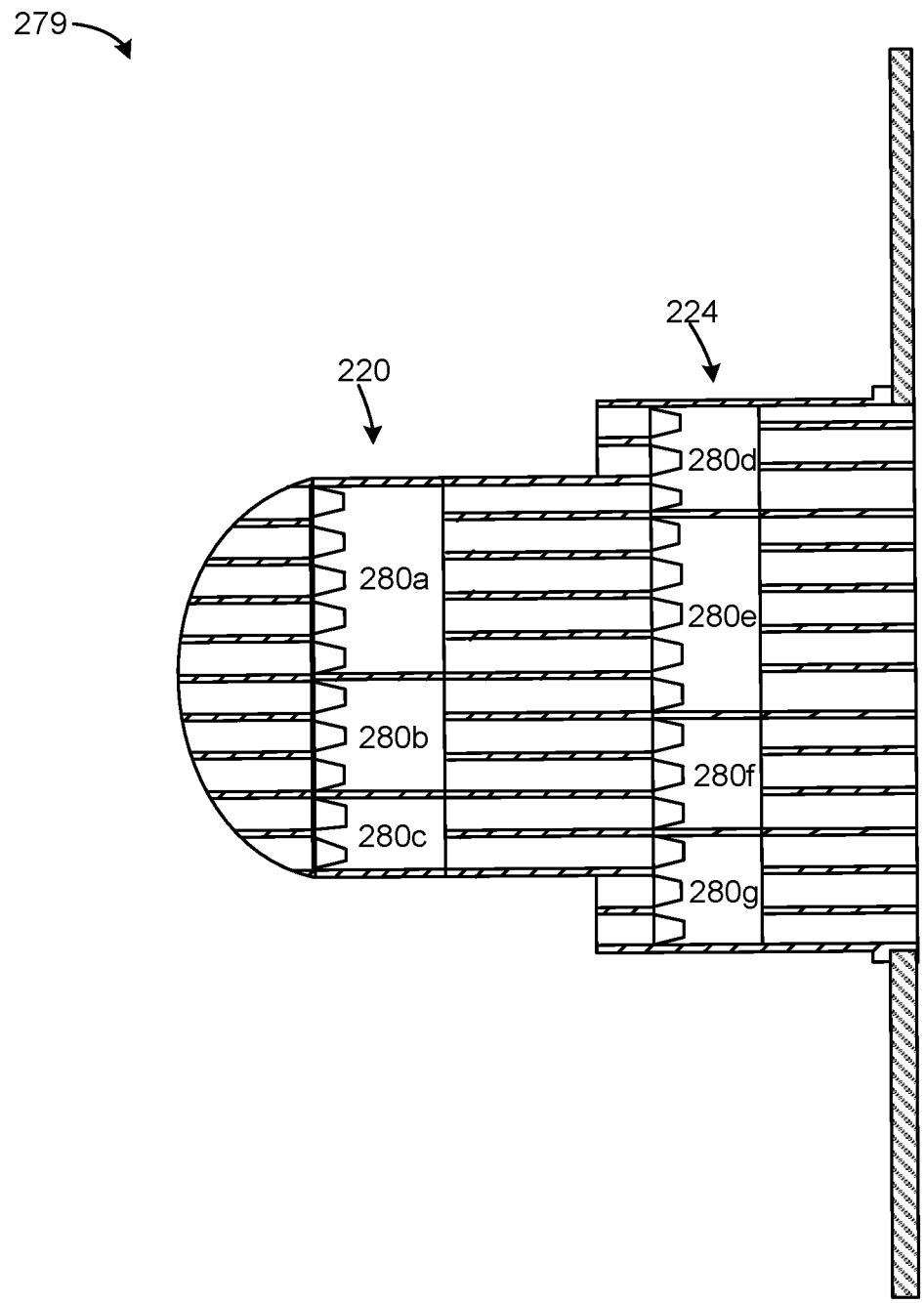
Figure 3A:
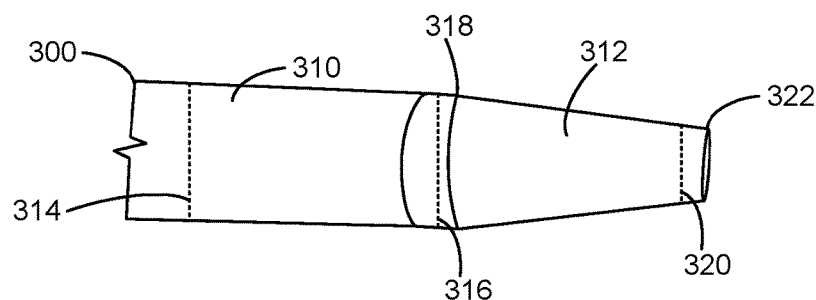
FIGS. 3A-3E are example fluid passageway structures constructed in accordance with teachings of this disclosure.
Figure 3B:
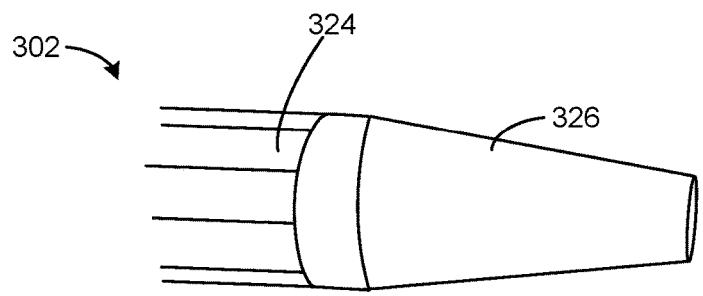
Figure 3C:
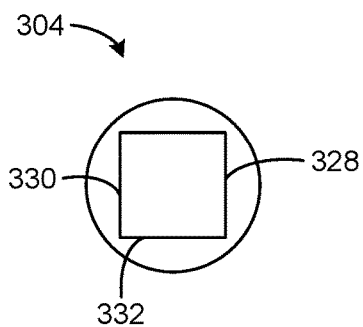
Figure 3D:
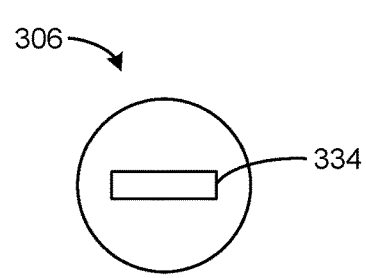
Figure 3E:
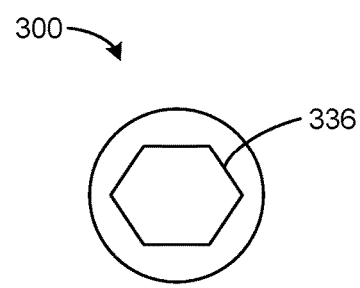

Turning to FIG. 2D, a cross-section of an example valve trim 279 that can be positioned in the valve body 102 to replace the valve trim 122, 200, and/or 206 is illustrated. The valve trim 279 of the illustrated example operates in a similar manner as the valve trim 200 of FIG. 2C. However, in contrast to the valve trim 200 of FIG. 2C, the first expansion cavity 220 and the second expansion cavity 224 include a plurality of expansion chambers 280*a-g* that further restrict the expansion of the fluid as the fluid exits the nozzles 250, 256, 278 to mitigate aerodynamic noise. In the illustrated example, the valve trim 279 includes the first expansion cavity 220 and the second expansion cavity 224. However, the valve trim 279 (and/or the valve trim 200) can have any number of expansion cavities (e.g., one expansion cavity, three expansion cavities, five expansion cavities, etc.).

FIGS. 3A-3E are enlarged views of passageways 300, 302, 304, 306, and 308 that may be used to implement the first passageways 218 of the example valve trim 200 of FIGS. 2A, 2C. In the illustrated example of FIG. 3A, the passageway 300 includes a fluid passageway 310 and a nozzle 312. In the illustrated example, the fluid passageway 310 has a first diameter 314, and the nozzle 312 has a second diameter 316 at a first end 318 of the nozzle 312 that is substantially similar to the first diameter 314 and a third diameter 320 at a second end 322 of the nozzle 312 that is smaller than the first and second diameters 314, 316. In other words, the nozzle 312 varies (e.g., increases) the fluid pressure as the fluid approaches the second end 322 of the nozzle 312. In such instances, the velocity increases when fluid exits the nozzle 312 (e.g., a lowest-pressure value) to the subsequent wider portion (e.g., a highest-pressure value in the expansion cavities 220, 224).

To achieve desired flow characteristics (e.g., enhanced flow capacity, reduction of noise and/or cavitation, etc.), the passageways (e.g., the first passageways 218, the second passageways 222, the third passageways 226) can have varying numbers of passageways and/or a geometries. For example, the passageway 302 of FIG. 3B has a plurality of fluid passageways 324 that extend into a nozzle 326. In other words, the nozzle 326 is formed on respective ends of the fluid passageways 324. The passageway 304 of the illustrated example of FIG. 3C has a first nozzle type 328 including a first side 330 and a second side 332 that are sized to define a square shape. In the illustrated example of FIG. 3D, the passageway 306 has a second nozzle type 334 that has a rectangular shape. The passageway 308 of the illustrated example of FIG. 3E has a third nozzle type 336 that is hexagonally shaped. However, any nozzle type (e.g., circular, hexagonal, diamond, etc.) may be formed on respective ends of the passageways (e.g., the first passageways 218, the second passageways 222, and the third passageways 226). For example, the first passageways 218 may have a first nozzle type (e.g., the nozzle type 328) and the second passageways 222 may have a second nozzle type (e.g., the nozzle type 334).

From the foregoing, it will be appreciated that example apparatus have been disclosed that enable a valve trim to provide certain fluid flow characteristics and/or pressure drop characteristics to reduce aerodynamic noise in a control valve. Example valve trim have been disclosed that provide various noise attenuators and expansion cavities to control pressure drops and reduce aerodynamic noise. Furthermore, example valve trim have been disclosed that include expansion chambers positioned in each expansion cavity to reduce aerodynamic noise.

The following paragraphs provide various examples of the examples disclosed herein.

Example 1 includes an apparatus including a valve body including a fluid flow path between an inlet and an outlet; valve trim positioned in the fluid flow path, the valve trim including first passageways that extend from the inlet to a first expansion cavity and second passageways that extend from the first expansion cavity to the outlet.

Example 2 includes the apparatus of example 1, wherein the first passageways extend along a longitudinal axis of the valve body.

Example 3 includes the apparatus of examples 1 or 2, wherein the first passageways include inlets at a first end of the valve trim and outlets at a first end of the expansion cavity.

Example 4 includes the apparatus of any of examples 1-3, wherein the second passageways include inlets at a second end of the expansion cavity opposite the first end of the expansion cavity.

Example 5 includes the apparatus of any of examples 1-4, wherein the second passageways extend from the first expansion cavity to a second expansion cavity.

Example 6 includes the apparatus of any of examples 1-5, further including third passageways that extend from the second expansion cavity to the outlet.

Example 7 includes the apparatus of any of examples 1-6, wherein the first passageways include a first passageway and a second passageway.

Example 8 includes the apparatus of any of examples 1-7, wherein the first passageway includes a first end adjacent the inlet and a second end adjacent the first expansion cavity.

Example 9 includes the apparatus of any of examples 1-8, wherein the first passageway includes a nozzle formed on the second end.

Example 10 includes the apparatus of any of examples 1-9, wherein the second passageway includes a third end adjacent the inlet and a fourth end adjacent the first expansion cavity.

Example 11 includes the apparatus of any of examples 1-10, wherein the second passageway includes a nozzle formed on the fourth end.

Example 12 includes the apparatus of any of examples 1-11, wherein the nozzle formed on the second end includes a first nozzle type, and the nozzle formed on the fourth end includes a second nozzle type.

Example 13 includes an apparatus including first passageways extending from a first surface of the valve trim to a first expansion area, the first expansion area having a first diameter; second passageways extending from the first expansion area to a second expansion area, the second expansion area having a second diameter different than the first diameter; and third passageways extending from the second expansion area to a second surface of the valve trim, the second surface having a third diameter different than the second diameter.

Example 14 includes the apparatus of example 13, wherein the first expansion area includes a first end and a second end separated by a first distance.

Example 15 includes the apparatus of example 13 or 14, wherein the second expansion area includes a third end and a fourth end separated by a second distance different than the first distance.

Example 16 includes the apparatus of any of examples 13-15, wherein the first passageways include a plurality of flow paths, the plurality of flow paths including nozzles formed on respective ends of the flow paths.

Example 17 includes the apparatus of any of examples 13-16, wherein the second passageways include first flow paths and second flow paths.

Example 18 includes the apparatus of any of examples 13-17, wherein the first flow paths include nozzles formed on respective ends of the first flow paths, and the second flow paths include a nozzle formed on outlets of the second flow paths.

Example 19 includes an apparatus including a valve body including a fluid flow path between an inlet and an outlet; and means for reducing aerodynamic noise positioned in the fluid flow path, the means for reducing aerodynamic noise including passageways and an expansion cavity.

Example 20 includes the apparatus of example 19, wherein the passageways include nozzles formed on respective ends of the passageways.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a valve body including a fluid flow path extending along a longitudinal axis between an inlet and an outlet; and
   valve trim positioned in the fluid flow path, the valve trim including:
      first passageways radially spaced relative to the longitudinal axis of the fluid flow path and extending between the inlet and a first expansion cavity;
      second passageways radially spaced relative to the longitudinal axis of the fluid flow path and extending between the first expansion cavity and the outlet; and
      a first tapered nozzle that extends from an end of at least one of the first passageways, wherein the first passageways, the first expansion cavity, and the second passageways are spaced along the longitudinal axis.

2. The apparatus of claim 1, wherein the end of the at least one of the first passageways is adjacent the first expansion cavity.

3. The apparatus of claim 1, wherein the first passageways include inlets adjacent a first end of the valve trim and outlets at a first end of the first expansion cavity.

4. The apparatus of claim 3, wherein the second passageways include inlets at a second end of the first expansion cavity opposite the first end of the first expansion cavity.

5. The apparatus of claim 1, wherein the second passageways extend from the first expansion cavity to a second expansion cavity.

6. The apparatus of claim 5, further including third passageways that extend from the second expansion cavity toward the outlet.

7. The apparatus of claim 1, including a second nozzle that extends from an end of another one of the first passageways.

8. The apparatus of claim 7, wherein the first tapered nozzle includes a first nozzle type, and the second nozzle includes a second nozzle type.

9. The apparatus of claim 7, wherein the end of the other one of the first passageways is adjacent the first expansion cavity.

10. An apparatus comprising:
first passageways extending from adjacent a first surface of a valve trim to a first expansion area, the first expansion area having a first diameter, the first passageways including a plurality of flow paths, the plurality of flow paths including tapered nozzles extending from respective ends of the flow paths;
second passageways extending from the first expansion area to a second expansion area, the second expansion area having a second diameter different than the first diameter;
third passageways extending from the second expansion area toward a second surface of the valve trim, the second surface having a third diameter different than the second diameter;
wherein the first passageways, the first expansion area, the second passageways, the second expansion area, and the third passageways are spaced along a fluid flow path extending along a longitudinal axis between the first surface and the second surface.

11. The apparatus of claim 9, wherein the first expansion area includes a first end and a second end separated by a first distance.

12. The apparatus of claim 10, wherein the second expansion area includes a third end and a fourth end separated by a second distance different than the first distance.

13. The apparatus of claim 9, wherein the second passageways include first flow paths and second flow paths.

14. The apparatus of claim 13, wherein the first flow paths include nozzles extending from respective ends of the first flow paths, and the second flow paths include nozzles extending from outlets of the second flow paths.

15. A valve trim apparatus for use with a fluid valve, the valve trim apparatus comprising:
a body defining a flow path between a first end of the body and a second end of the body opposite the first end, the body defining a first expansion cavity between the first end and the second end;
a plurality of first passageways positioned between the first end of the body and the first expansion cavity, a first one of the first passageways being radially spaced from a second one of the first passageways relative to a longitudinal axis of the flow path, the first one of the first passageways having a first center axis and the second one of the first passageways having a second center axis, wherein the first center axis is offset relative to the second center axis, the first passageways having a first length in a direction along the longitudinal axis that is greater than a length of the first expansion cavity; and
a plurality of second passageways positioned between the first expansion cavity and the second end of the body, a third one of the second passageways being radially spaced from a fourth one of the second passageways relative to the longitudinal axis of the flow path, the second passageways having a second length in a direction along the longitudinal axis that is greater than a length of a second expansion cavity.

16. The apparatus of claim 15, wherein the first expansion cavity includes a plurality of first expansion cavities, wherein respective ones of the first passageways extend to respective ones of the first expansion cavities.

17. The apparatus of claim 15, wherein a first one of the first passageways is fluidly isolated from a second one of the first passageways.

18. The apparatus of claim 15, wherein the body defines the second expansion cavity between the first expansion cavity and the second end of the body, the second passageways positioned between the first expansion cavity and the second expansion cavity.

19. The apparatus of claim 18, further including a plurality of third passageways positioned between the second expansion cavity and an outlet, a fifth one of the third passageways being radially spaced from a sixth one of the third passageways.

20. The apparatus of claim 18, wherein the first one of the first passageways includes a first nozzle that defines a first exit of the first one of the first passageways.

21. The apparatus of claim 20, wherein the second one of the first passageways includes a second nozzle that defines a second exit of the second one of the first passageways, the first nozzle having a first shape or first diameter and the second nozzle having a second shape or second diameter, the first shape or first diameter being different than the second shape or second diameter.

* * * * *